(12) United States Patent
Taylor

(10) Patent No.: US 7,708,562 B2
(45) Date of Patent: May 4, 2010

(54) MASTERY-BASED DRILL AND PRACTICE ALGORITHM

(75) Inventor: Timothy D. Taylor, Alpharetta, GA (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 11/130,040

(22) Filed: May 16, 2005

(65) Prior Publication Data
US 2006/0257838 A1 Nov. 16, 2006

(51) Int. Cl.
G09B 3/00 (2006.01)

(52) U.S. Cl. .............. 434/322; 434/323; 434/350; 434/362; 706/927; 706/61

(58) Field of Classification Search ............ 434/118, 434/322, 323, 350, 362
See application file for complete search history.

(56) References Cited

U.S. PATENT DOCUMENTS

| | | | | |
|---|---|---|---|---|
| 5,059,127 A * | 10/1991 | Lewis et al. | ............... | 434/353 |
| 5,496,175 A * | 3/1996 | Oyama et al. | ............... | 434/118 |
| 5,797,754 A | 8/1998 | Griswold et al. | | |
| 5,888,071 A * | 3/1999 | Takamori | ............... | 434/156 |
| 5,967,793 A * | 10/1999 | Ho et al. | ............... | 434/362 |
| 6,212,358 B1 * | 4/2001 | Ho et al. | ............... | 434/362 |
| 6,270,352 B1 * | 8/2001 | Ditto | ............... | 434/118 |
| 6,287,123 B1 * | 9/2001 | O'Brien | ............... | 434/118 |
| 6,315,572 B1 * | 11/2001 | Owens et al. | ............... | 434/322 |
| 6,551,109 B1 * | 4/2003 | Rudmik | ............... | 434/322 |
| 6,863,606 B1 * | 3/2005 | Berg et al. | ............... | 463/16 |
| 2004/0029092 A1 * | 2/2004 | Orr et al. | ............... | 434/354 |
| 2005/0019737 A1 * | 1/2005 | Iida et al. | ............... | 434/322 |
| 2005/0026131 A1 | 2/2005 | Elzinga et al. | | |
| 2005/0196730 A1 * | 9/2005 | Kellman | ............... | 434/118 |
| 2005/0221265 A1 * | 10/2005 | Tashiro et al. | ............... | 434/322 |
| 2005/0272021 A1 * | 12/2005 | Yu | ............... | 434/322 |
| 2006/0099562 A1 * | 5/2006 | Carlsson | ............... | 434/350 |
| 2006/0199165 A1 * | 9/2006 | Crowhurst et al. | ............... | 434/350 |

OTHER PUBLICATIONS

George A. Miller, The Magical Number Seven, Plus or Minus Two: Some Limits on Our Capacity for Processing Information, The Psychological Review, 1956, vol. 63, pp. 81-97 (originally published), pp. 1-21.

* cited by examiner

Primary Examiner—Cameron Saadat
Assistant Examiner—Bruk A Gebremichael
(74) Attorney, Agent, or Firm—Schmeiser, Olsen & Watts; Anna L. Linne

(57) ABSTRACT

A method and system for learning. Items to be learned are distributed among an unmastered pool, a ready pool, a mastered pool, and a delayed pool. Items from the unmastered pool are placed in the ready pool. A current item randomly selected from the ready pool is presented to a user who responds to the item. The current item is sent to the mastered pool if the user's response is correct and (the current item was not previously presented to the user or the user responded correctly to the current item during the last J times that the user responded to the current item). Otherwise, the current item is sent to the delayed pool followed by transferring the current item to the ready pool after K additional items are presented to by the user. J and K are each at least 1.

21 Claims, 5 Drawing Sheets

MASTERY-BASED DRILL AND PRACTICE ALGORITHM

BACKGROUND OF THE INVENTION

1. Technical Field

The present invention relates to a method and system for facilitating a learning of items by a user.

2. Related Art

Learning objectives may comprise memorization. Examples of such memorization may include multiplication tables, foreign language vocabulary, historical events and dates, etc. Known methods of memorization are inefficient. For example, if one wants to memorize the capital cities of all 50 states in the USA, one might create 50 flash cards, each with the name of a state on one side and the capital city on the other. However, running through the stack of 50 flash cards, from start to finish, multiple times is not a very efficient way to memorize the capital cities of all 50 states in the USA.

Thus, there is a need for an efficient method and system for facilitating memorization.

SUMMARY OF THE INVENTION

The present invention provides a method for facilitating a learning of items by a user, said method implemented by execution of computer readable program code on a processor of a computer system, said method comprising:

providing an unmastered pool, a ready pool, a mastered pool, and a delayed pool;

providing items to be learned by the user in the unmastered pool;

randomly selecting N items from the unmastered pool, said N at least 5;

transferring the selected N items to the ready pool;

randomly selecting a current item from the ready pool;

presenting the current item to the user;

receiving a correct or incorrect response to the current item from the user;

if a correct response to the current item was received from the user and (the current item had not previously been presented to the user or the user had responded correctly to the current item during a last J times that the user responded to the current item such that said J at least 1):

then transferring the current item from the ready pool to the mastered pool followed by randomly selecting another item from the unmastered pool and transferring the selected another item to the ready pool, else placing the current item into the delayed pool followed by transferring the current item to the ready pool after K additional items are subsequently randomly selected from the ready pool, presented to the user, and responded to by the user, said K at least 1.

The present invention provides a computer program product, comprising a computer usable medium having a computer readable program code embodied therein, said computer readable program code comprising an algorithm adapted to implement a method for facilitating a learning of items by a user, said method comprising:

providing an unmastered pool, a ready pool, a mastered pool, and a delayed pool;

providing items to be learned by the user in the unmastered pool;

randomly selecting N items from the unmastered pool, said N at least 5;

transferring the selected N items to the ready pool;

randomly selecting a current item from the ready pool;

presenting the current item to the user;

receiving a correct or incorrect response to the current item from the user;

if a correct response to the current item was received from the user and (the current item had not previously been presented to the user or the user had responded correctly to the current item during a last J times that the user responded to the current item such that said J at least 1):

then transferring the current item from the ready pool to the mastered pool followed by randomly selecting another item from the unmastered pool and transferring the selected another item to the ready pool, else placing the current item into the delayed pool followed by transferring the current item to the ready pool after K additional items are subsequently randomly selected from the ready pool, presented to the user, and responded to by the user, said K at least 1.

The present invention provides a process for deploying computing infrastructure, comprising integrating computer-readable code into a computing system, wherein the code in combination with the computing system is capable of performing a method for facilitating a learning of items by a user, said method comprising:

providing an unmastered pool, a ready pool, a mastered pool, and a delayed pool;

providing items to be learned by the user in the unmastered pool;

randomly selecting N items from the unmastered pool, said N at least 5;

transferring the selected N items to the ready pool;

randomly selecting a current item from the ready pool;

presenting the current item to the user;

receiving a correct or incorrect response to the current item from the user;

if a correct response to the current item was received from the user and (the current item had not previously been presented to the user or the user had responded correctly to the current item during a last J times that the user responded to the current item such that said J at least 1):

then transferring the current item from the ready pool to the mastered pool followed by randomly selecting another item from the unmastered pool and transferring the selected another item to the ready pool, else placing the current item into the delayed pool followed by transferring the current item to the ready pool after K additional items are subsequently randomly selected from the ready pool, presented to the user, and responded to by the user, said K at least 1.

The present invention provides a system comprising a processor and a computer readable memory unit coupled to the processor, said memory unit containing instructions that when executed by the processor implement a method for facilitating a learning of items by a user, said method comprising:

providing an unmastered pool, a ready pool, a mastered pool, and a delayed pool;

providing items to be learned by the user in the unmastered pool;

randomly selecting N items from the unmastered pool, said N at least 5;

transferring the selected N items to the ready pool;

randomly selecting a current item from the ready pool;

presenting the current item to the user;

receiving a correct or incorrect response to the current item from the user;

if a correct response to the current item was received from the user and (the current item had not previously been presented to the user or the user had responded correctly to the current item during a last J times that the user responded to the current item such that said J at least 1):

then transferring the current item from the ready pool to the mastered pool followed by randomly selecting another item from the unmastered pool and transferring the selected another item to the ready pool, else placing the current item into the delayed pool followed by transferring the current item to the ready pool after K additional items are subsequently randomly selected from the ready pool, presented to the user, and responded to by the user, said K at least 1.

The present invention advantageously provides an efficient method and system for facilitating memorization.

DETAILED DESCRIPTION OF THE INVENTION

George A. Miller indicated that people can absorb approximately seven (plus or minus two) new pieces of information at once and that attempts to introduce more than seven (plus or minus two) new pieces of information at once will cause an information overload that inhibits the learning process. See Miller, George A., "The Magical Number Seven, Plus or Minus Two: Some Limits on our Capacity for Processing Information," Psychological Review, volume 63, pages 81-97 (1956). The method and system of the present invention for facilitating the learning process is consistent with Miller's theory and effectuates an extremely efficient mechanism for learning and memorization. The method and system of the present invention for facilitating the learning process may be implemented by software being executed by a processor of a computer system.

Figure 1:
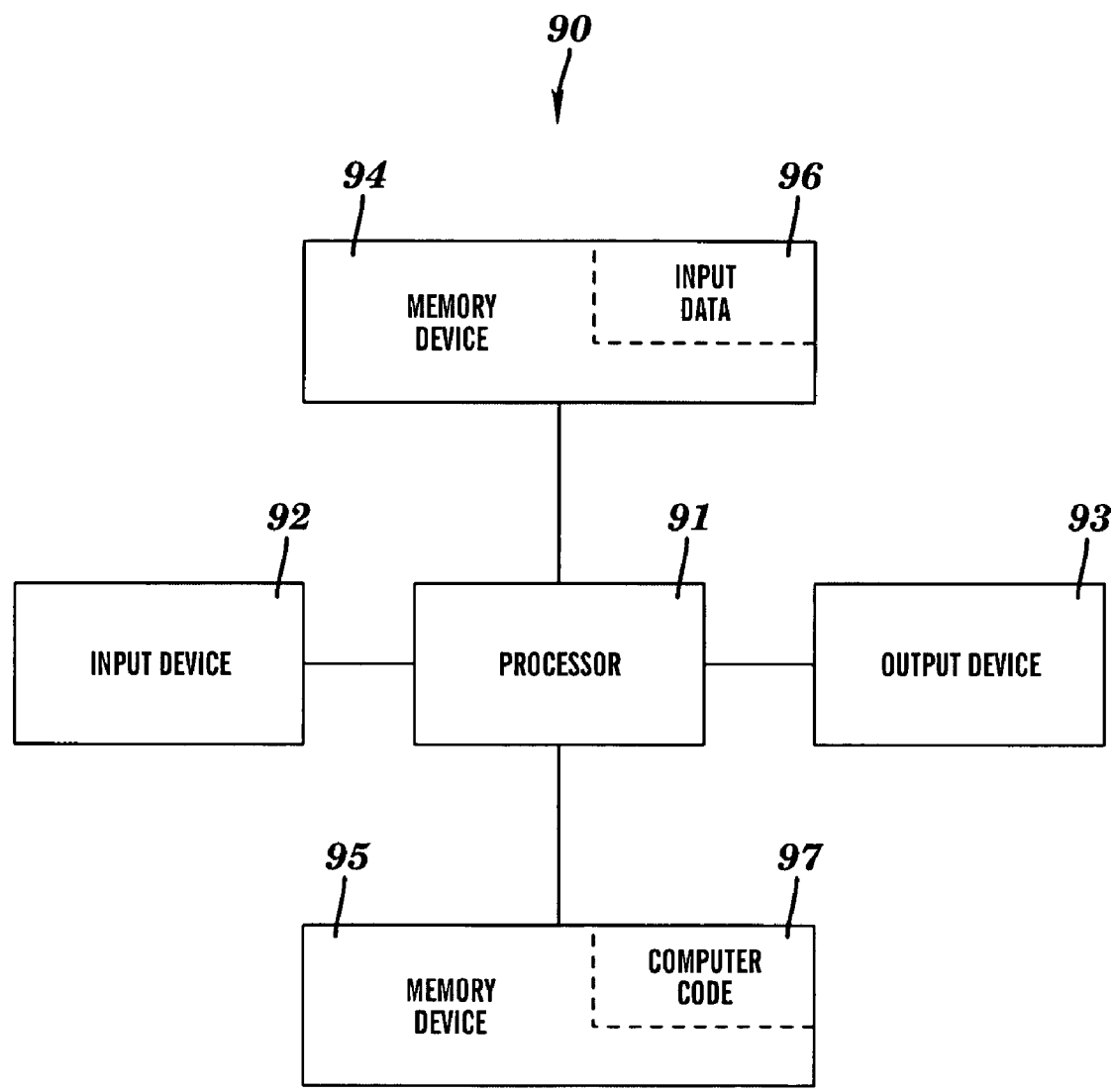
FIG. 1 illustrates a computer system used for facilitating a learning of items by a user, in accordance with embodiments of the present invention.

FIG. 1 illustrates a computer system 90 used for facilitating a learning of items by a user, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for facilitating a learning of items by a user. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 1) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method facilitating a learning of items by a user.

While FIG. 1 shows the computer system 90 as a particular configuration of hardware and software, any configuration of hardware and software, as would be known to a person of ordinary skill in the art, may be utilized for the purposes stated supra in conjunction with the particular computer system 90 of FIG. 1. For example, the memory devices 94 and 95 may be portions of a single memory device rather than separate memory devices.

The algorithm in the computer code 90 generates the following pools for storing and/or tracking data, namely an unmastered pool, a ready pool, a mastered pool, and a delayed pool. The preceding four pools may be located in any memory device (e.g., memory device 94, 95, etc.) or in any combination of memory devices or may alternatively be effectuated by a series of pointers which point to items that are selectively comprised by one of the four preceding pools.

Initially, items to be learned by the user are provided in the unmastered pool by any method that would be known or obvious to a person skilled in the art (e.g., by hard-coding said items in the unmastered pool, accepting said items as input from the user and placing the accepted items in the unmastered pool, retrieving items from a file or database and placing said retrieved items in the unmastered pool, etc.). An "item" that is placed in the unmastered pool comprises subject matter to be learned by the user and is in a form adapted to elicit a response to the item from the user, wherein said response from the user is objectively correct or incorrect. For example, the item may be a question adapted to elicit a response of "true" or "false. As another example, the item may be a multiple-choice question. As yet another example, the item may be a statement having a "fill-in-the-blank" portion. To illustrate, the statement: "The name of the organ of the body that pumps blood throughout the body is: _", wherein the correct response is "heart" and any other response is incorrect.

Figure 2A:
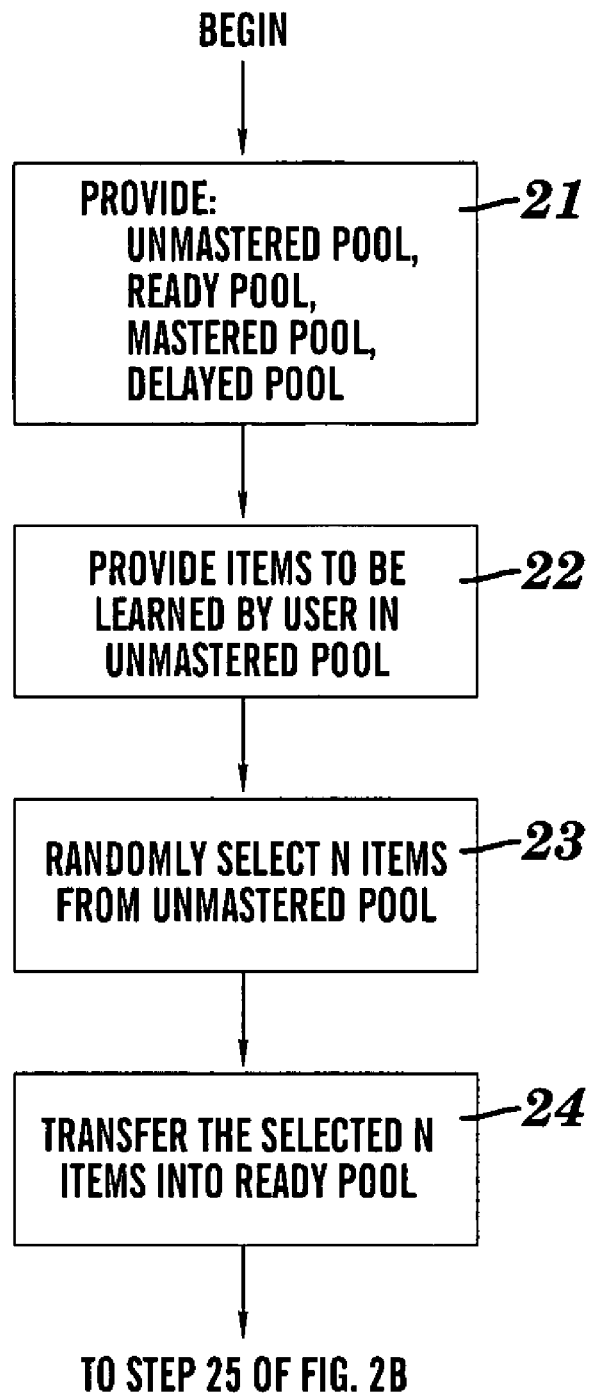
FIGS. 2A-2B is a flow chart depicting a method for facilitating a learning of items by a user in conjunction with an unmastered pool, a ready pool, a mastered pool, and a delayed pool, in accordance with embodiments of the present invention.
Figure 2B:
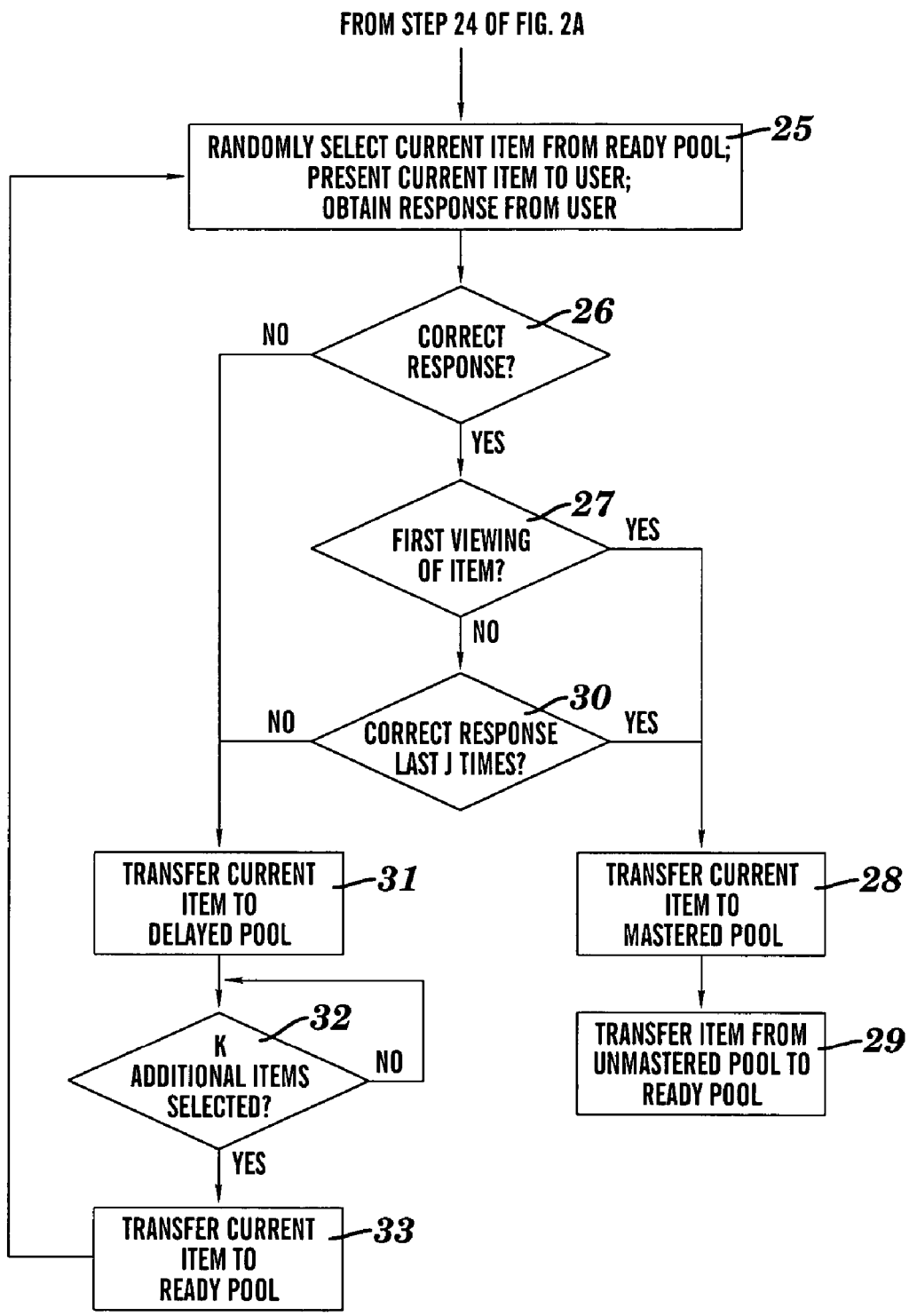

FIGS. 2A-2B (collectively, "FIG. 2") is a flow chart depicting in steps 21-33 a method for facilitating a learning of items by a user in conjunction with an unmastered pool, a ready pool, a mastered pool, and a delayed pool, in accordance with embodiments of the present invention.

Step 21 provides an unmastered pool, a ready pool, a mastered pool, and a delayed pool, such as, inter alia, by providing memory or storage for each of said pools.

Step 22 provides items to be learned by the user into the unmastered pool. The items provided in step 22 may consist exclusively of new items that the user has not yet learned. Alternatively, the items provided in step 22 may include items both new items that the user has not yet learned and other items that the user has already learned by intent or by chance.

In one embodiment, the items in the unmastered pool may each be assigned a weight for various purposes such as random sampling purposes as will be discussed infra.

Step 23 randomly selects N items from the unmastered pool, wherein N is at least 5, which is consistent with Miller's theory discussed supra. Since Miller's theory proposes a maximum of 7±2 new items, N=5, 6, 7, 8, or 9 may be used. Since the unmastered pool may include items that the user has already learned (items which are not "new" to the user), a value of N exceeding 9 is consistent with Miller's theory in some embodiments and is therefore within the scope of the present invention.

In some embodiments, the N items in step 23 may be randomly selected from a uniform probability distribution. In other embodiments, the items in the unmastered pool are weighted such that the probability of each item being randomly selected is a function of the weight of each item (e.g., the probability of each item being randomly selected may be proportional to the weight of each item). For example, some items provided in the unmastered pool in step 22 may be considered to be more difficult to learn than other items and may therefore be weighted higher than other items in order to have a better chance of being randomly selected than other items. As another example, some items provided in the unmastered pool in step 22 may be considered to be more important than other items and may therefore be weighted higher than other items in order to have a better chance of being randomly selected than other items.

Step 24 transfers the N items selected in step 23 to the ready pool. In step 25, an item is randomly selected from the ready pool and the selected item from the ready pool is designated as the "current item." The current item is presented to the user and the user responds to the current item (i.e., communicates an answer to the current item which may be a correct or incorrect answer). Thus, a correct or incorrect response to the current item is received from the user. The random selection of the current item in step 25 may be from a uniform probability distribution or from a weighted probability distribution in the same manner as discussed supra in conjunction with step 23.

Step 26 determines whether the response to the current item received from the user is correct. If step 26 determines that the response to the current item received from the user is correct, then step 27 is next executed; otherwise step 31 is next executed.

Step 27 determines whether the current item was presented to the user in step 25 for the first time (i.e., whether the current item had not previously been presented to the user). If step 27 determines that the current item was presented to the user in step 25 for the first time, then steps 28 and 29 are next executed; otherwise step 30 is next executed.

Step 30 determines whether the user had responded correctly to the current item during the last J times that the user responded to the current item. J is at least 1 and may have other values such as, inter alia, J=2, 3, 4, 5, 6, 7, 8, 9, 10, etc. If step 30 determines that the user had responded correctly to the current item during the last J times that the user responded to the current item, then steps 28 and 29 are next executed; otherwise step 31 is next executed Step 28 transfers the current item from the ready pool to the mastered pool. Step 29 randomly selects another item from the unmastered pool and transfers the selected another item to the ready pool. The random selection of the another item in step 29 may be from a uniform probability distribution or from a weighted probability distribution in the same manner as discussed supra in conjunction with step 23.

Step 31 places the current item into the delayed pool. The current item in the delayed pool will be subsequently placed in the ready pool after, in accordance with steps 32-33, K additional items are subsequently randomly selected from the ready pool, presented to the user, and responded to by the user. K is at least 1 and may have other values such as, inter alia, K=2, 3, 4, 5, 6, 7, 8, 9, 10, etc.

Step 32 determines whether said K additional items have been subsequently randomly selected from the ready pool, presented to the user, and responded to by the user. When step 32 determines that said K additional items have been subsequently randomly selected from the ready pool, presented to the user, and responded to by the user, step 33 transfers the current item from the delayed pool to the ready pool where the current item is subject to again being randomly selected in step 25 for presentation to the user.

The parameter K in step 31 is a delay parameter that controls an amount of delay (in terms of the number of additional items subsequently selected and presented to the user) until the current item is transferred from the delayed pool to the ready pool. As K increases, more items are in the delayed pool and fewer items are in the ready pool. Therefore in one embodiment, a value of N is selected after a value of K is selected, wherein N is selected in dependence on K. For example, N may be an increasing function of K.

In one embodiment a value may be selected for the parameter K, wherein the value of K is specific to the current item, and wherein the value of K is selected in consideration of a characteristic of the current item. For example, the characteristic of the current item may be an importance of the current item, a difficulty level of the current item, or a combination thereof.

It should be noted that new items may be added to the unmastered pool at any time; e.g., after randomly selecting the current item from the ready pool.

Figure 3:
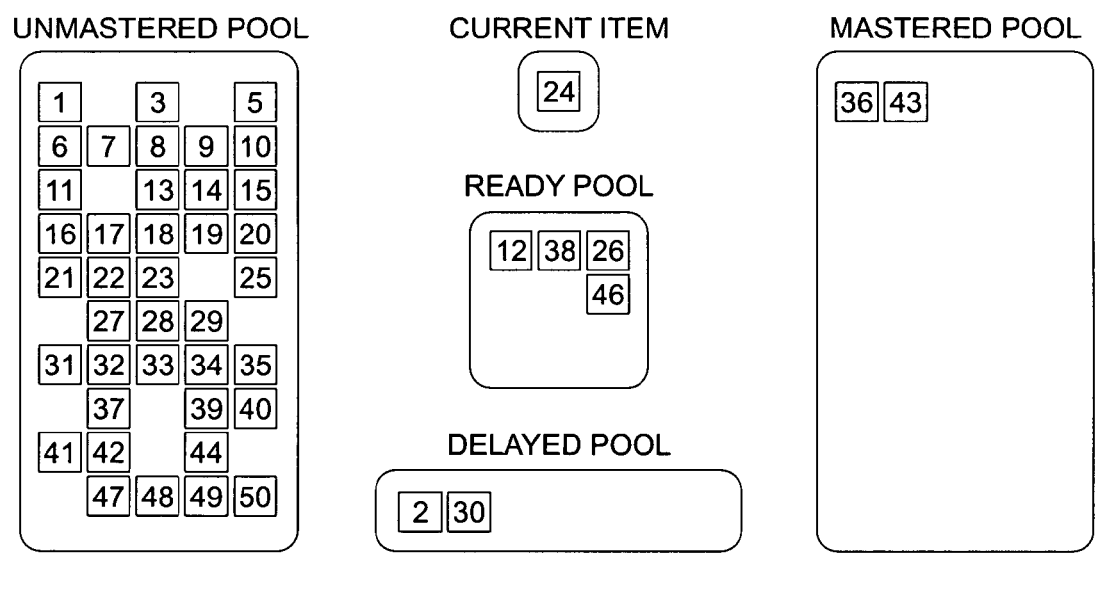
FIG. 3 depicts an unmastered pool, a ready pool, a mastered pool, a delayed pool, and a current item being processed, together with an illustration of the items in each pool, in accordance with embodiments of the present invention.

FIG. 3 depicts an unmastered pool, a ready pool, a mastered pool, a delayed pool, and a current item being processed, together with an illustration of the items in each pool, in accordance with embodiments of the present invention. It should be noted that a sum of the number of items in the ready pool and the delayed pool+1 (for the current item) is N.

Figure 4:
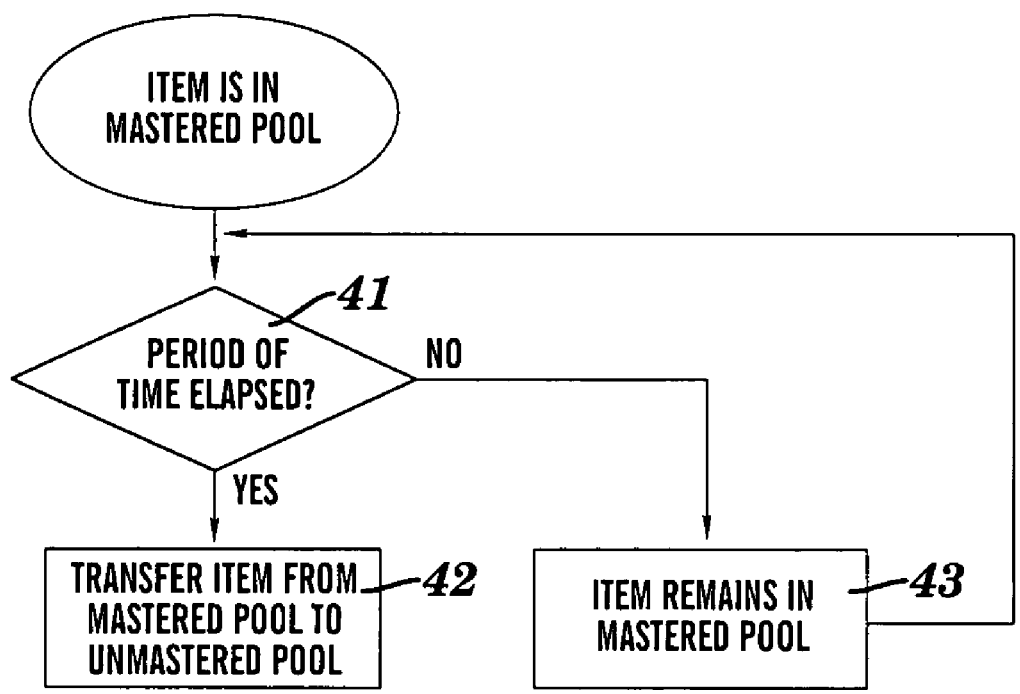
FIG. 4 is a flow chart depicting an embodiment in which an item in the mastered pool is recycled back into the unmastered pool after a specified period of time has elapsed, in accordance with embodiments of the present invention.

FIG. 4 is a flow chart depicting in steps 41-43 an embodiment in which an item in the mastered pool is recycled back into the unmastered pool after a specified period of time has elapsed, in accordance with embodiments of the present invention.

Step 41 determines whether a specified period of time (e.g., 4 day, 1 week, 1 month, etc.) has elapsed since a first item had been placed in the mastered pool. If step 41 determines that a specified period of time has elapsed since the first item had been placed in the mastered pool, then the first item is transferred in step 42 from the mastered pool to the unmastered pool. Otherwise, step 43 retains the first item in the mastered pool and loops back to step 41.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for facilitating a learning of items by a user, said method comprising:
providing an unmastered pool, a ready pool, a mastered pool, and a delayed pool;

specifying a period of time after which any mastered item in the mastered pool is recycled back into the unmastered pool;

providing items to be learned by the user in the unmastered pool, said ready pool consisting of items previously transferred from the unmastered pool, said items previously transferred being stored in the ready pool;

assigning a weight to each item in the unmastered pool, wherein each item in the unmastered pool has a probability of being randomly selected such that said probability is a function of said weight, wherein said probability is proportional to said weight, and wherein said assigning assigns the weight to each item based on a relative importance of each item and not based on a relative difficulty of learning each item;

specifying a function relating an integer N to an integer K, said function being an increasing function of K, said function of K having a value of at least 5 for each value of K not less than 2;

selecting K of at least 2;

after said specifying the function and after said selecting K, determining N from the increasing function of K, said N at least 5;

after said determining N, randomly selecting N items from the unmastered pool;

transferring the selected N items to the ready pool;

after said transferring the selected N items, a processor of a computer system randomly selecting a current item from the ready pool, said selected current item being an item previously transferred from the unmastered pool to the ready pool;

after said randomly selecting the current item and before presenting the current item to the user, adding new items to the unmastered pool;

presenting the current item to the user;

after said presenting the current item, receiving a response to the current item from the user, said response being a correct response or an incorrect response;

after said receiving the response, ascertaining whether a condition is satisfied, said condition being that a correct response to the current item was received from the user and (the current item had not previously been presented to the user or the user had responded correctly to the current item during a last J times that the user responded to the current item such that said J at least 2);

if said ascertaining whether the condition is satisfied ascertains that the condition is satisfied:

then transferring the current item from the ready pool to the mastered pool as a mastered item followed by randomly selecting another item from the unmastered pool and transferring the selected another item to the ready pool and further followed by recycling the mastered item from the mastered pool to the unmastered pool after the mastered item has been in the mastered pool for the specified period of time, else placing the current item into the delayed pool;

ascertaining that K additional items have been subsequently randomly selected from the ready pool, presented to the user, and responded to by the user;

after said ascertaining that K additional items have been subsequently randomly selected from the ready pool, presented to the user, and responded to by the user, transferring the current item from the delayed pool to the ready pool, wherein said current item is again randomly selected for presentation.

2. The method of claim 1, wherein said ascertaining ascertains that the condition is satisfied.

3. The method of claim 1, wherein said ascertaining ascertains that the condition is not satisfied.

4. The method of claim 2, wherein the correct response to the current item was received from the user, and wherein the current item had not previously been presented to the user.

5. The method of claim 2, wherein the correct response to the current item was received from the user, wherein the current item had previously been presented to the user, and wherein the user had responded correctly to the current item during the last J times that the user responded to the current item.

6. The method of claim 3, wherein the correct response to the current item was not received from the user.

7. The method of claim 3, wherein the correct response to the current item was received from the user, wherein the current item had previously been presented to the user, and wherein the user had not responded correctly to the current item during the last J times that the user responded to the current item.

8. A process for deploying computing infrastructure, comprising integrating computer-readable code into a computing system, wherein the code in combination with the computing system is capable of performing a method for facilitating a learning of items by a user, said method comprising:

providing an unmastered pool, a ready pool, a mastered pool, and a delayed pool;

specifying a period of time after which any mastered item in the mastered pool is recycled back into the unmastered pool;

providing items to be learned by the user in the unmastered pool, said ready pool consisting of items previously transferred from the unmastered pool, said items previously transferred being stored in the ready pool;

assigning a weight to each item in the unmastered pool, wherein each item in the unmastered pool has a probability of being randomly selected such that said probability is a function of said weight, wherein said probability is proportional to said weight, and wherein said assigning assigns the weight to each item based on a relative importance of each item and not based on a relative difficulty of learning each item;

specifying a function relating an integer N to an integer K, said function being an increasing function of K, said function of K having a value of at least 5 for each value of K not less than 2;

selecting K of at least 2;

after said specifying the function and after said selecting K, determining N from the increasing function of K, said N at least 5;

after said determining N, a processor of a computer system randomly selecting N items from the unmastered pool;

transferring the selected N items to the ready pool;

after said transferring the selected N items, randomly selecting a current item from the ready pool, said selected current item being an item previously transferred from the unmastered pool to the ready pool;

after said randomly selecting the current item and before presenting the current item to the user, adding new items to the unmastered pool;

presenting the current item to the user;

after said presenting the current item, receiving a response to the current item from the user, said response being a correct response or an incorrect response;

after said receiving the response, ascertaining whether a condition is satisfied, said condition being that a correct response to the current item was received from the user and (the current item had not previously been presented to the user or the user had responded correctly to the current item during a last J times that the user responded to the current item such that said J at least 2);

if said ascertaining whether the condition is satisfied ascertains that the condition is satisfied:

then transferring the current item from the ready pool to the mastered pool as a mastered item followed by randomly selecting another item from the unmastered pool and transferring the selected another item to the ready pool and further followed by recycling the mastered item from the mastered pool to the unmastered pool after the mastered item has been in the mastered pool for the specified period of time, else placing the current item into the delayed pool;

ascertaining that K additional items have been subsequently randomly selected from the ready pool, presented to the user, and responded to by the user;

after said ascertaining that K additional items have been subsequently randomly selected from the ready pool, presented to the user, and responded to by the user, transferring the current item from the delayed pool to the ready pool, wherein said current item is again randomly selected for presentation.

9. The process of claim 8, wherein said ascertaining ascertains that the condition is satisfied.

10. The process of claim 8, wherein said ascertaining ascertains that the condition is not satisfied.

11. The method of claim 9, wherein the correct response to the current item was received from the user, and wherein the current item had not previously been presented to the user.

12. The method of claim 9, wherein the correct response to the current item was received from the user, wherein the current item had previously been presented to the user, and wherein the user had responded correctly to the current item during the last J times that the user responded to the current item.

13. The method of claim 10, wherein the correct response to the current item was not received from the user.

14. The method of claim 10, wherein the correct response to the current item was received from the user, wherein the current item had previously been presented to the user, and wherein the user had not responded correctly to the current item during the last J times that the user responded to the current item.

15. A computer program product, comprising a computer readable storage medium having a computer readable program code embodied therein, said program code configured to perform a method by being executed by a processor of a computer system, said method comprising:

providing an unmastered pool, a ready pool, a mastered pool, and a delayed pool;

specifying a period of time after which any mastered item in the mastered pool is recycled back into the unmastered pool;

providing items to be learned by the user in the unmastered pool, said ready pool consisting of items previously transferred from the unmastered pool, said items previously transferred being stored in the ready pool;

assigning a weight to each item in the unmastered pool, wherein each item in the unmastered pool has a probability of being randomly selected such that said probability is a function of said weight, wherein said probability is proportional to said weight, and wherein said assigning assigns the weight to each item based on a relative importance of each item and not based on a relative difficulty of learning each item;

specifying a function relating an integer N to an integer K, said function being an increasing function of K, said function of K having a value of at least 5 for each value of K not less than 2;

selecting K of at least 2;

after said specifying the function and after said selecting K, determining N from the increasing function of K, said N at least 5;

after said determining N, randomly selecting N items from the unmastered pool;

transferring the selected N items to the ready pool;

after said transferring the selected N items, randomly selecting a current item from the ready pool, said selected current item being an item previously transferred from the unmastered pool to the ready pool;

after said randomly selecting the current item and before presenting the current item to the user, adding new items to the unmastered pool;

presenting the current item to the user;

after said presenting the current item, receiving a response to the current item from the user, said response being a correct response or an incorrect response;

after said receiving the response, ascertaining whether a condition is satisfied, said condition being that a correct response to the current item was received from the user and (the current item had not previously been presented to the user or the user had responded correctly to the current item during a last J times that the user responded to the current item such that said J at least 2);

if said ascertaining whether the condition is satisfied ascertains that the condition is satisfied:

then transferring the current item from the ready pool to the mastered pool as a mastered item followed by randomly selecting another item from the unmastered pool and transferring the selected another item to the ready pool and further followed by recycling the mastered item from the mastered pool to the unmastered pool after the mastered item has been in the mastered pool for the specified period of time, else placing the current item into the delayed pool;

ascertaining that K additional items have been subsequently randomly selected from the ready pool, presented to the user, and responded to by the user;

after said ascertaining that K additional items have been subsequently randomly selected from the ready pool, presented to the user, and responded to by the user, transferring the current item from the delayed pool to the ready pool, wherein said current item is again randomly selected for presentation.

16. The computer program product of claim 15, wherein said ascertaining ascertains that the condition is satisfied.

17. The computer program product of claim 16, wherein the correct response to the current item was received from the user, and wherein the current item had not previously been presented to the user.

18. The computer program product of claim 16, wherein the correct response to the current item was received from the user, wherein the current item had previously been presented to the user, and wherein the user had responded correctly to the current item during the last J times that the user responded to the current item.

19. The computer program product of claim 15, wherein said ascertaining ascertains that the condition is not satisfied.

20. The computer program product of claim 19, wherein the correct response to the current item was not received from the user.

21. The computer program product of claim 19, wherein the correct response to the current item was received from the user, wherein the current item had previously been presented to the user, and wherein the user had not responded correctly to the current item during the last J times that the user responded to the current item.

* * * * *